United States Patent Office 3,793,269
Patented Feb. 19, 1974

---

3,793,269
WALLBOARD TAPE JOINT COMPOSITION EMPLOYING A WATER-SOLUBLE POLYMERIC BINDER CONTAINING POLYACRYLAMIDE, CELLULOSE ETHER, LIMESTONE, MICA AND ASBESTOS
Fabio B. Bruschtein and Dennis L. Lyftogt, Midland, Mich., assignors to The Dow Chemical Company, Midland, Mich.
No Drawing. Filed July 21, 1972, Ser. No. 273,843
Int. Cl. C08b 21/32
U.S. Cl. 260—17                                    4 Claims

ABSTRACT OF THE DISCLOSURE

Desirable wallboard tape joint compositions comprise a conventional mineral filler mixture, such as finely ground limestone, mica and asbestos, intimately mixed with a conditioner, such as a water-soluble cellulose ether, and containing as the binder a polyacrylamide having a controlled degree of hydrolysis and viscosity characteristics.

BACKGROUND OF THE INVENTION

In modern dry wall construction, it is common practice to cover the joints of gypsum wallboard with a paper or fabric tape which is adhered to the wallboard by a tape joint composition. One type of such composition employs a major proportion of gypsum as shown in U.S. Pat. 3,303,147. However, such compositions set up relatively rapidly by a hydration reaction and thus can lead to waste and undesirable expense. Another type of tape joint composition embodies inert mineral fillers such as ground limestone, mica and asbestos together with a water-soluble cellulose ether and a binder such as casein. When casein is employed, it is necessary to incorporate an alkaline agent to solubilize the casein and an antimicrobial agent to prevent putrefaction thereof.

Polymers and copolymers of acrylamide have been previously suggested as water-soluble adhesives, for example, in U.S. Pats. 2,616,818, 2,953,546 and 2,976,262. However, acrylamide polymers of commerce have not been found suitable for incorporation as binders in tape joint compositions due to the special properties which are required for an effective, practical tape joint composition. Thus, for example, when water is mixed with the dry powder composition, the resulting paste or "mud" should be ready for use in a relatively short time after mixing, preferably within about 10 minutes. Further, such composition after mixing with water must have proper workability whereby the aqueous mixture is not too thick for ease of application nor so thin as to run off or sag when applied. The composition must give good adhesion of the tape to the wallboard and of the mineral composition to the wallboard and the tape so that separation or chalking does not occur after drying. Also, it is necessary that the composition when dry have water hold-out properties such that subsequent application of an aqueous topping compound or the use of water-based paint will not destroy the integrity of the joint.

SUMMARY OF THE INVENTION

In accordance with the present invention, it has been discovered that superior tape joint compositions are produced by incorporating therein from about 1.5 percent by weight to about 5 percent by weight of specially characterized polyacrylamide. More particularly the composition of the present invention comprises a major proportion of finely ground limestone, a minor proportion of asbestos shorts and other mineral fillers, from about 0.25 to about 1 percent by weight of a water-soluble cellulose ether and from about 1.5 to about 5 percent by weight of the specially characterized polyacrylamide. Such polyacrylamides adapted to be employed in the compositions of the invention are water-soluble and have a low degree of hydrolysis such that not more than about 5 percent of the carboxamide groups of a homopolymer of acrylamide have been hydrolyzed to carboxyl groups. Stated in another way, these polyacrylamides have a degree of hydrolysis of from 0 to about 5 percent. Further, said polyacrylamides have a particle size such that 100 percent thereof passes through a screen having 40 meshes to the inch; preferably the finely ground polymer should pass 100 percent through a 50-mesh screen. Finally, these polyacrylamides are characterized by a molecular weight in the range such that a 0.5 percent by weight solution thereof in distilled water adjusted to a pH of 3 with hydrochloric acid has an Ostwald viscosity of from 1.6 to about 2.4 centipoises, preferably from 1.8 to 2.4 centipoises, when measured at 25° C.

The proportions of the mineral filler ingredients employed in the compositions of the invention may vary depending upon the particular end use envisioned. Generally the compositions will comprise from about 55 to 84 percent by weight of finely ground limestone; from about 5 to about 10 percent by weight of asbestos; from about 5 to about 20 percent by weight of mica and 0 to 5 percent of other minerals such as silica and the like. Typical compositions to be mixed with water and applied to the wallboard joint immediately prior to the application of the tape contain from about 60 to 70 percent by weight of ground limestone, 10 to 20 percent asbestos, 10 to 20 percent mica together with 0.25 to 1 percent of a water-soluble cellulose ether and from about 3 to about 5 percent of a water-soluble polyacrylamide as described above. Alternatively, where a topping composition is desired for covering the tape joint and blending with the rest of the wall, higher proportions of the ground limestone, up to about 84 percent, may be employed with corresponding decreases in the amounts of the other mineral fillers and the proportion of polyacrylamide may be decreased to from about 1.5 to about 3 percent by weight.

The mineral fillers employed are readily available commodities and standard commercial grades thereof are satisfactory provided that each filler ingredient is finely ground as discussed hereinafter. The ground limestone may be predominantly calcite or may include magnesium carbonate as found in dolomitic limestone.

The water-soluble cellulose ether employed may be a hydroxyethylcellulose or a hydroxyalkyl methylcellulose. This ingredient contributes to the workability of the paste resulting from incorporating water into the dry composition and provides a desirable effect on the drying rate whereby cracking of the dried paste is minimized. Good results have been obtained when employing a finely ground hydroxypropyl methylcellulose sold by The Dow Chemical Company under the trademark Methocel 228.

Suitable polyacrylamides, having the desired low degree of hydrolysis and the proper range of molecular weight as evidenced by the viscosity of the product, may be prepared by polymerizing high-purity acrylamide monomer under controlled conditions of temperature, pH and catalyst concentration. A polyacrylamide having the desired properties may be prepared in the following manner. A 20 percent by weight solution of acrylamide monomer in deionized water is adjusted to a pH of 4.5 and a temperature of about 35° C. and sparged with nitrogen for 10 minutes to purge the solution of inhibitory oxygen. On completion of the purging, a 10 percent solution of the pentasodium salt of (carboxymethylimino) bis(ethylenenitrilo)tetraacetic acid (Versenex 80) is added in amount to provide 1000 parts of the Versenex 80 compound per million parts of monomer.

Thereafter separate streams of aqueous 10 percent solution of sodium persulfate and aqueous 10 percent solution of sodium bisulfite are added with stirring in amount to provide 1300 parts of each of the persulfate and bisulfite per million parts of monomer to act as polymerization catalyst. Reaction is initiated by addition of the catalyst and the temperature of the reaction mixture rises to about 80° C. in a period of 15 to 18 minutes. The reaction mixture is maintained at 80° C. for about 30 additional minutes to complete the polymerization and the product is dried in any suitable fashion as, for example, on a double drum drier. For purposes of the present invention the dried polymer is finely ground as, for example, in a high-speed hammer mill and sieved to obtain a product of which 100 percent passes a screen having 40 meshes to the inch.

In carrying out the invention, it is desirable that all of the constituents be individually finely ground prior to blending. Substantially all of the mineral constituents should be ground to pass a screen having 100 meshes to the inch while the cellulose ether and polyacrylamide should pass a screen having 40 meshes to the inch and preferably 50 meshes to the inch. The ingredients are measured out and blended together in any desired order provided efficient mixing equipment is employed to assure homogeneous mixing of the ingredients. If desired, the final mixture may be run through a hammer mill or the like for further assurance of homogeneity.

In use, the dry composition is mixed with sufficient water, generally from about 60 to 95 milliliters of water per 100 grams of dry mix, to produce the proper consistency for application. After thorough mixing of the dry ingredients with the water, the resulting mixture is allowed to stand for at least ten minutes, preferably at least 30 minutes, and is then applied to the gypsum wallboard joint employing a conventional flat instrument or knife to provide a thickness of 25 to 70 mils of the moist composition. Cellulosic joint tape is then applied over the composition and pressed in place with the knife. Under conditions of normal room temperature and humidity, the composition cures in a period of about 18 hours. Under higher humidity conditions, longer cure times must be allowed.

In a representative operation, the following mineral filler mixture was prepared by thorough mixing of the dry ingredients.

| Ingredient: | Percent by weight |
|---|---|
| Ground limestone | 70 |
| Mica (muscovite) | 19 |
| Asbestos (chrysotile) | 11 |

Each of the above ingredients was finely ground so that essentially 100 percent thereof passed a screen having 100 meshes to the inch. The desired tape joint composition was prepared by thoroughly mixing 955 parts by weight of the above filler mixture was 5 parts of a hydroxypropyl methylcellulose (Methocel 228) and 40 parts of polyacrylamide. The polyacrylamide employed has less than 1 percent of its carboxamide groups hydrolyzed to carboxyl groups, as determined by potentiometric titration, and was characterized by a viscosity of 1.8 centipoises for a 0.5 percent by weight solution thereof in distilled water adjusted to pH 3 with hydrochloric acid as measured at a temperature of 25° C. using an Ostwald viscosimeter.

One hundred grams of the foregoing tape joint composition was mixed with about 90 milliliters of water and stirred to form a paste. The latter was allowed to stand for 30 minutes and checked for workability. On determining that the paste possessed proper workability, a portion of the paste was applied to a piece of gypsum wallboard with a wallboard knife to supply a layer of paste about 25 mils in thickness and the cellulosic wallboard tape was then pressed into the paste with the wallboard knife. The resulting test piece was dried at room temperature and room humidity for 18 hours. The test piece was then checked by standard evaluations for adhesion, dry rub resistance and water hold-out and found to equal or exceed such test values for a standard commercial tape joint composition.

When other polyacrylamides were tested in the above formulation it was found that when such polymers had a degree of hydrolysis above 5 percent or were characterized by a viscosity of less than 1.6 or greater than 2.4 centipoises under the specified conditions for said determination the tape joint composition was inferior in one or more of the tests for adhesion, water hold-out or workability. When the polyacrylamide employed had a particle size such that any substantial portion thereof would not pass a sieve having 40 meshes to the inch the resulting paste contained undesirable gel-like masses.

As is well recognized in the polyacrylamide art, substantially similar polymers may be prepared by hydrolyzing homopolymeric acrylamide or by copolymerizing acrylamide and acrylic acid. Thus, reference in the present specification and claims to polyacrylamide hydrolyzed to a degree of up to about 5 percent is intended to be inclusive of copolymers of acrylamide with up to about 5 mole percent of acrylic acid or an alkali metal acrylate.

We claim:
1. A dry powder composition suitable on admixture with water for adhering and covering wallboard joint tapes which comprises from about 55 to about 84 percent by weight of minus 100 mesh ground limestone, from about 5 to about 10 percent by weight of asbestos, from about 5 to about 20 percent by weight of minus 100 mesh mica, from about 0.25 to about 1 percent by weight of water-soluble cellulose ether and from about 1.5 to about 5 percent by weight of a water-soluble polyacrylamide, said polyacrylamide having a low degree of hydrolysis of from 0 to about 5 percent and a particle size such that 100 percent passes a 40-mesh screen and being characterized by an Ostwald viscosity of 1.6 to about 2.4 centipoises for a 0.5 percent by weight solution thereof in distilled water adjusted to a pH of 3 and at a temperature of 25° C.

2. A composition according to claim 1 wherein the polyacrylamide is characterized by a viscosity of 1.8 to 2.4 centipoises for a 0.5 percent by weight solution under the test conditions.

3. A composition according to claim 2 wherein the polyacrylamide is hydrolyzed to the extent of 0 to about 1 percent.

4. A composition according to claim 1 wherein the mineral filler consists essentially of about 60 to 70 percent of ground limestone, about 10 to 20 percent of asbestos and about 10 to 20 percent of mica.

References Cited

UNITED STATES PATENTS 3,303,147   2/1967   Elden _____ 260—17 X

HOWARD E. SCHAIN, Primary Examiner

U.S. Cl. X.R.

161—250

UNITED STATES PATENT OFFICE
CERTIFICATE OF CORRECTION

Patent No. 3,793,269　　　　　　　　　Dated 19 February 1974

Inventor(s)　　Fabio B. Bruschtein , et al

It is certified that error appears in the above-identified patent and that said Letters Patent are hereby corrected as shown below:

Column 3, line 56 delete "was" and insert -- with --

Signed and Sealed this thirtieth Day of March 1976

[SEAL]

Attest:

RUTH C. MASON
Attesting Officer

C. MARSHALL DANN
Commissioner of Patents and Trademarks